June 2, 1970  P. A. M. DE VALROGER ET AL  3,515,966
MOTOR AND PUMP COMBINATION FED BY A DIRECT CURRENT OR
RECTIFIED CURRENT POWER SOURCE
Filed April 19, 1968  6 Sheets-Sheet 1
FIG.1
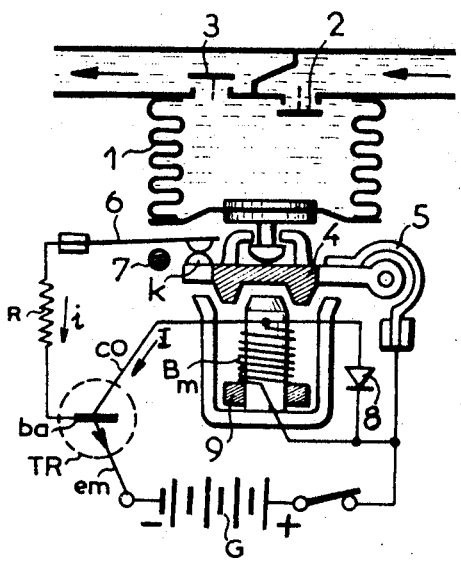
FIG.4a
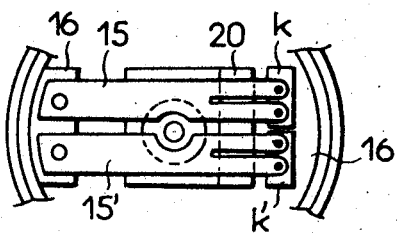
FIG.4b
FIG.2
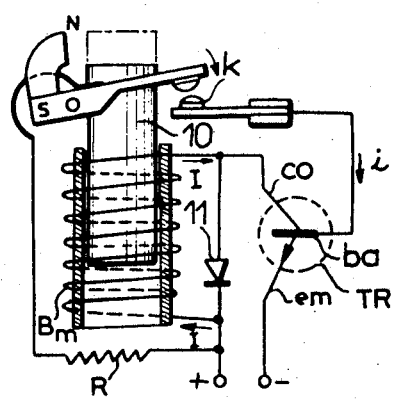
FIG.5
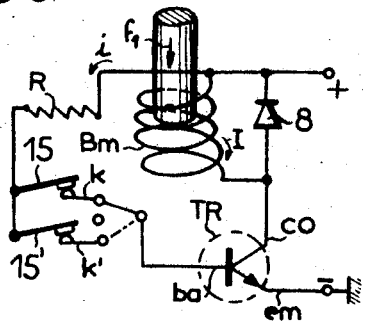
Inventor:
PIERRE ALBERT MARIE DE VALROGER
MARIUS LAVET
by Flynn + Frishauf
Attys

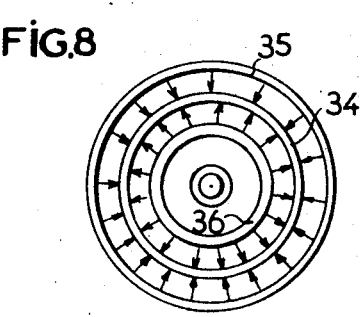
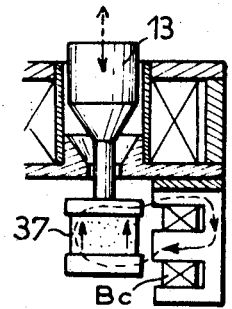
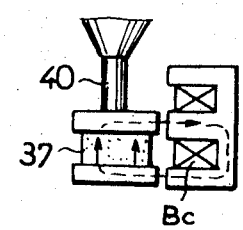
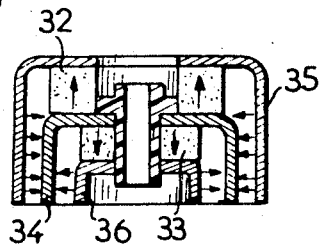
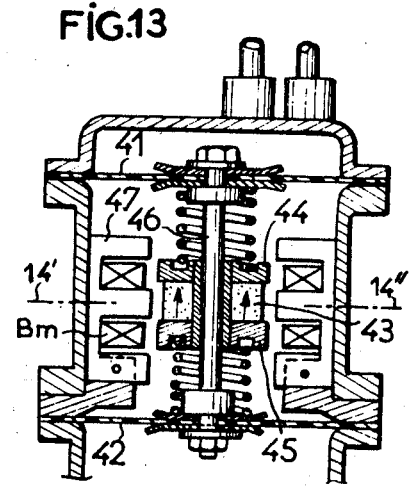
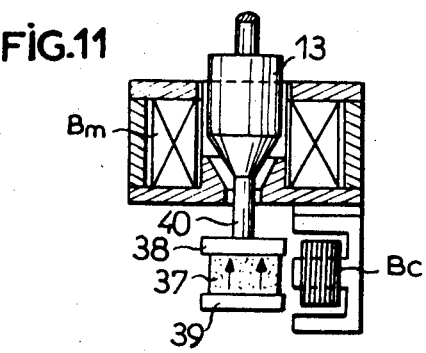

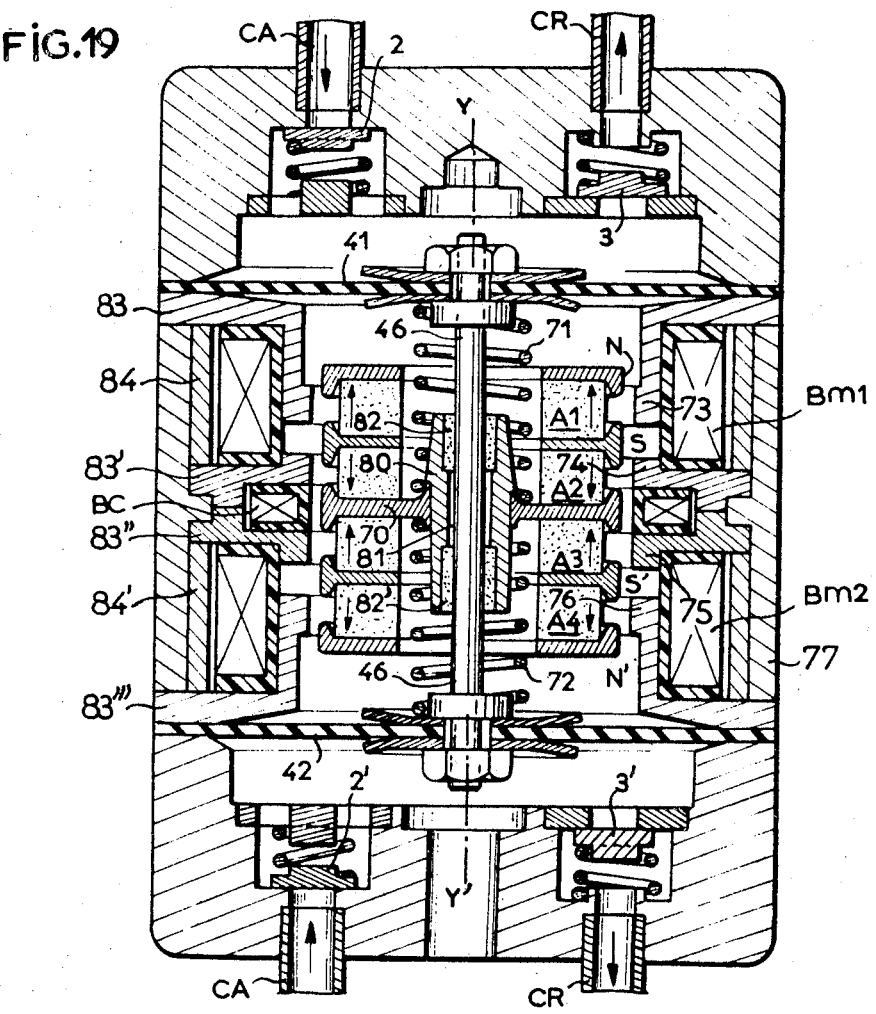

3,515,966
MOTOR AND PUMP COMBINATION FED BY A
DIRECT CURRENT OR RECTIFIED CURRENT
POWER SOURCE
Pierre Albert Marie de Valroger, 21 Rue Saint-Guillaume, 75 Paris 7e, France, and Marius Lavet, 36 Rue Gabrielle, 75 Paris 18e, France
Filed Apr. 19, 1968, Ser. No. 722,585
Claims priority, application France, Apr. 21, 1967, 103,604
Int. Cl. H02k *33/10*
U.S. Cl. 318—127     8 Claims

ABSTRACT OF THE DISCLOSURE

A reciprocatory electric motor comprises a transistor connected between a source of potential and a motor winding and triggering means including a mechanical switch or a pick-up coil or the like connected to the transistor to vary the voltage on the control electrode in accordance with the position of the movable unit.

---

The present invention concerns improvements in motors fed by a direct current or rectified current power source, these motors consisting essentially of driving elements to which reciprocatory movements are imparted under the action of intermittent electromagnetic forces set up by windings through which pass short current transmissions each time the driving members are moved in predetermined directions.

Motors of the type considered are already used for driving suction and force pumps, comprising pump bodies having movable walls, the volumes of which are modified by successive attractions of electromagnets having reciprocating armatures or plungers. In these systems, each movement is rapid in the direction corresponding to suction and is then slowed down in the opposite direction during delivery which is operated for longer or shorter intervals depending on requirements. A known system of this kind utilises current pulses which produce the successive suctions of the liquid, the said pulses being distributed by means of a switch having movable contacts controlled by the movement of the armature or plunger of the driving electromagnet and opening or closing the circuit of the principal motor winding.

This device has serious disadvantages due to the fact that very destructive electric arcs are struck between the parts in contact at the instance of opening the inductive circuits. These sparks cause erosion and deterioration of the switch, and consequently unsatisfactory functioning or stoppage of the pump. Furthermore, the sparks may cause very troublesome radioelectric interference.

The construction of gas pumps and compressors actuated by electromagnets of the deformable ferromagnetic circuit type or electrodynamic type fed continuously off an A.C. voltage source has also been proposed. For example, such apparatus is connected to the 50 or 60 cycle A.C. power distribution mains. In this case, reciprocation of the movable member of the motor does not necessitate the operation of a switch giving rise to very harmful sparking. This system, however, has various disadvantages, resulting from the fact that the reciprocating frequency depends on the frequency of the supply current. Practice shows that to obtain satisfactory functioning, it is necessary that the motor equipment should be constructed so that it behaves like an electromechanical oscillator of the inertia-elasticity type having a natural frequency very close to the frequency of the source of A.C. power. This condition makes it possible to utilise mechanical resonance and the motor considered has the properties of a reciprocating synchronous motor. It is known that this type of motor can function with good efficiency only if resonance tuning is well observed; if not, the amplitude of the oscillating member is subject to considerable variations. The application of this motor to powerful pumps and compressors does not always give satisfaction because agreement between the mechanical natural frequency and the frequency of the electric current cannot be maintained under all working conditions; running troubles are to be expected because the considerable and variable forces opposing the movements substantially modify the natural frequency of the masses in oscillatory movement. The system considered, therefore, is unsuitable for pumps and other utilisation apparatus, the members of which have to move according to very different rates and even stop when the work to be accomplished is temporarily suspended for unforeseen periods.

It has also been proposed, in reciprocating electromagnetic motors, to eliminate all the electrical contacts controlling the feed circuit of the motor winding by controlling the feed circuit by electronic switching devices, using either semiconductors, such as a transistor, or a triode tube rendered alternately conducting or non-conducting as a function of the variations of current to the principal motor winding, for example by means of auxiliary armature windings connected to the control electrode of the switch (transistor base or triode grid). Known devices of this kind, however, do not permit the construction of motors of high specific power having very reliable starting. In addition, in their application to pumps, an additional difficulty arises in that the control circuit of the transistor or triode should be able to adapt itself to the movements of variable speed of the movable part of the magnetic circuit. In addition, transistors connected in highly inductive circuits are exposed to dangerous overvoltages.

According to the present invention, the disadvantages of the known types of electromagnetic motors operating by successive pulses are remedied by eliminating the movable switches which have frequently to interrupt considerable currents giving rise to sparking, as well as the disadvantages of the known devices without contacts. This result is achieved by effecting the closing and opening of the principal working circuits also by means static electronic switches of semi-conductor type adapted to assume successively two states: a fully conductive state for a short time, and then a non-conductive state opposing the supply of the source for an automatically variable period. According to the invention however, the power transistor is brought to its maximum conductivity state during a considerable part of the movement of the moveable equipment, in only one direction, by means of a triggering device actuated directly by the arrival of this moveable equipment into a well-determined position, and applying to the control electrode of the power transistor, by a circuit of very low inductance, a weak control current, independent of the current feeding the motor winding.

In the following, this triggering member will be denoted briefly as the "pick-up" of the improved motor.

According to a first embodiment, the invention is materialised by an electromagnetic motor of the iron armature or plunger type, the winding of which is fed intermittently off a direct or rectified current power source due to the interposition of a power transistor, preferably of the silicon n-p-n type; the said transistor is rendered very rapidly a good conductor by means of an auxiliary trigger circuit in which are included the "emitter" and "base" electrodes; triggering of the pulse is produced by means of a pick-up actuated when the armature or plunger of the electromagnet arrives near the end of its inoperative stroke and propulsion is arrested automatically slightly before the end of the operative stroke, that is to say of the travel during which it has to perform driving work, which pick-up may be formed by a contact connected in the auxiliary control circuit of the transistor.

The invention is also materialised in a motor of the electrodynamic type comprising an electromagnet having a plunger and provided with at least one permanent magnet attracted or repelled by a fixed winding, the said winding being connected to the power source developing a unidirectional voltage by means of the "emitter" and "collector" electrodes of a power transistor. In this latter system, triggering and interruption of the driving current transmissions are preferably effected by means of an electromagnetic induction pick-up formed by a fixed auxiliary winding and by at least one magnet secured to the movable member of the motor.

The invention is extended to various types of utilisation apparatus, such as pumps of various patterns, compressor, acoustic warning devices, the principal elements of which consist of improved motors according to the invention.

Other features and advantages of the invention will appear in the course of this description, given with reference to the accompanying drawings, in which the invention is represented according to specific embodiment examples:

FIG. 1 is a diagrammatic view of a liquid pump actuated by an improved motor of the electromagnetic type exerting successive attractions on an iron armature;

FIG. 2 represents diagrammatically an improved motor of the electromagnet type, sucking an iron plunger forming the moveable piston of a pump;

Figure 3:
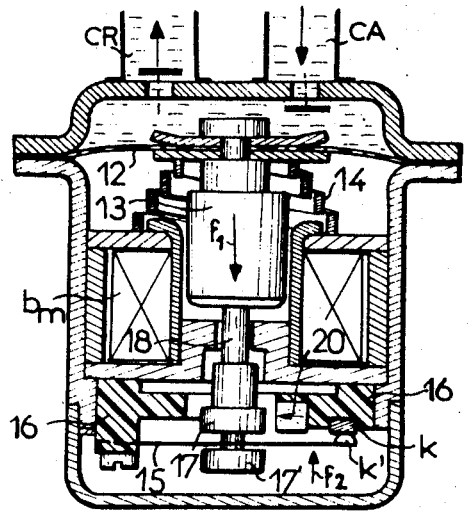
Figure 6:
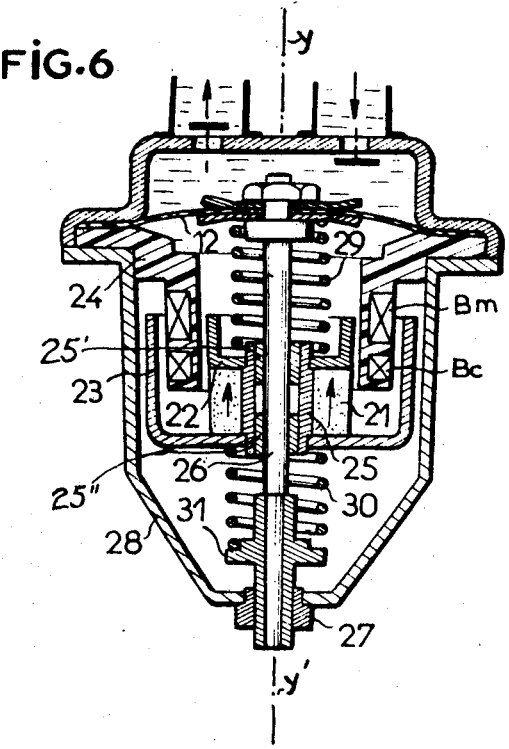
Figure 7:
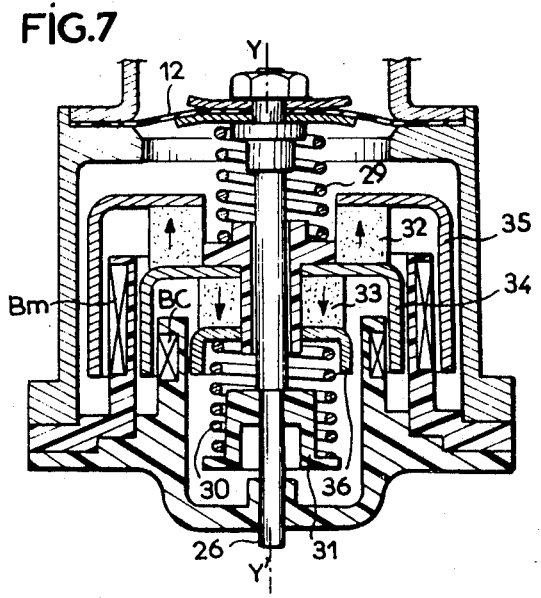
Figure 10:
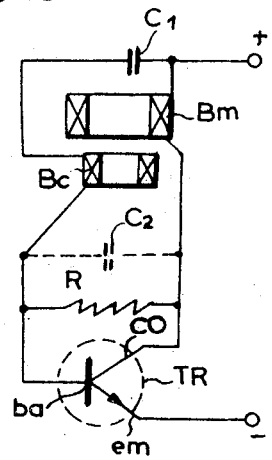
Figure 14:
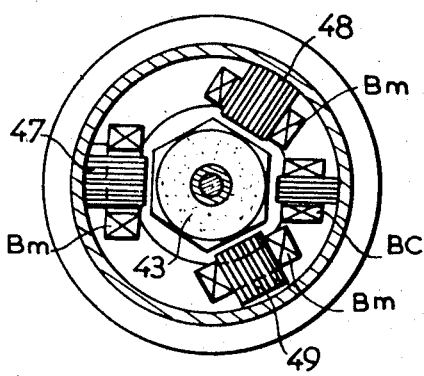
Figure 15:
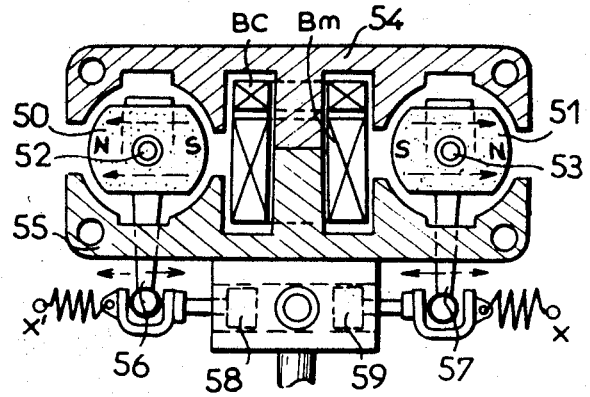
Figure 16:
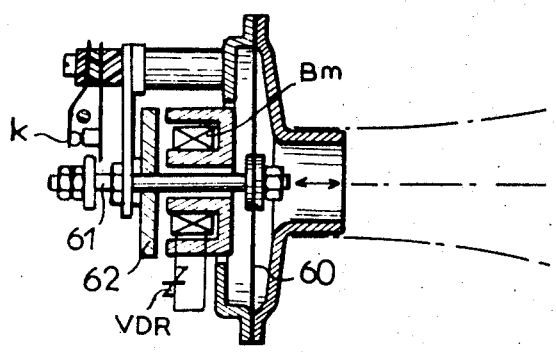
Figure 17:
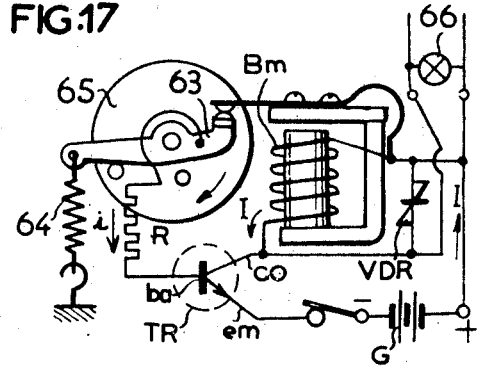
Figure 18A:
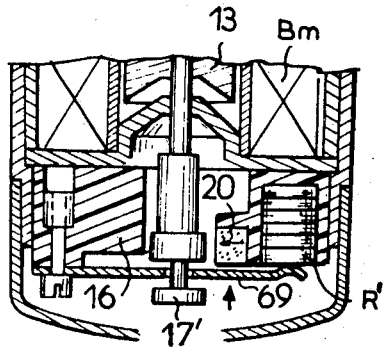
Figure 18B:
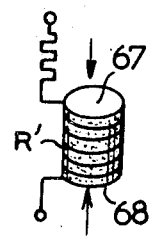
Figure 20:
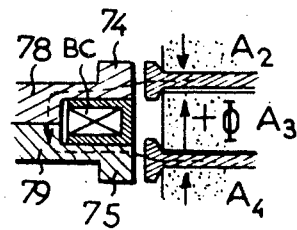
Figure 21:
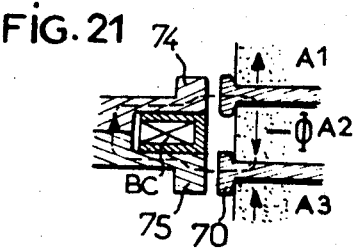
Figure 22:
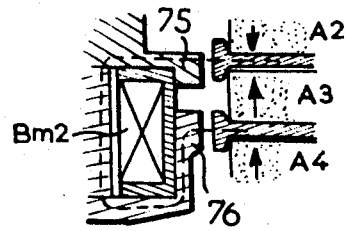
Figure 23:
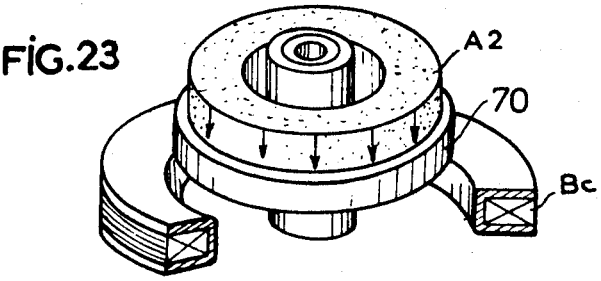
Figure 24:
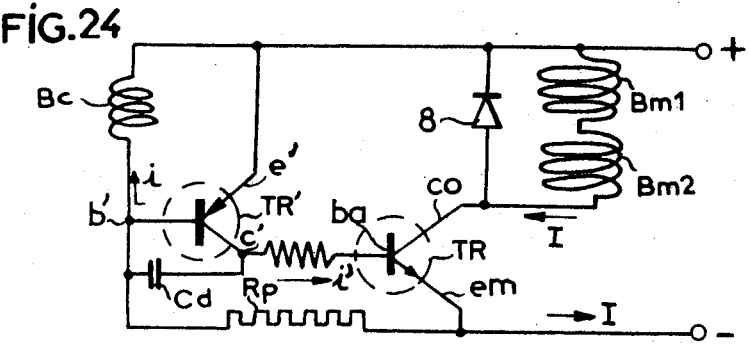

FIG. 3 a view in axial section of a liquid pump of known type, having a flexible diaphragm, the said diaphragm, however, being actuated by an improved motor according to the invention, comprising a position pick-up having an auxiliary contact operating without sparks;

FIG. 4 shows separately some constituent parts of the contact pick-up of the pump of FIG. 3;

FIG. 5 is an electric circuit diagram of the motor shown in FIG. 3;

FIG. 6 shows an axial section of a pump of the type having a diaphragm deformed by a motor of electrodynamic type improved according to the invention;

FIG. 7 shows a constructional modification of the pump of FIG. 6;

FIG. 8 is a detail view showing in plan, viewed from below, the movable part of the motor shown in FIG. 7;

FIG. 9 is a view in axial section corresponding to FIG. 8;

FIG. 10 is an electric circuit diagram of the motor of FIG. 7;

FIG. 11 represents an electromagnetic induction pick-up applicable to the feed of the winding of the motor shown in FIG. 3;

FIG. 12 shows the extreme positions of the movable element of the pickup shown in FIG. 11;

FIG. 13 is an axial section of a pump having two diaphragms actuated simultaneously by an improved motor according to the invention;

FIG. 14 is a cross-sectional view in the plane 14'–14'', corresponding to FIG. 13;

FIG. 15 shows an example of the combination of two improved motors according to the invention for ensuring the drive in phase opposition of two pistons of a gas compressor;

FIG. 16 shows in axial section the principal members of an improved motor according to the invention for intense vibration of the diaphragm of an acoustic warning device;

FIG. 17 shows an improved reciprocating motor for periodically interrupting a lighting circuit by means of a transistor;

FIG. 18 is a view in axial section of a piezoelectric pick-up suitable for motors of the kind shown in FIG. 3;

FIG. 19 shows a section on a vertical plane of a pump having two conjugate diaphragms actuated by an improved motor of very compact construction;

FIGS. 20 to 22 are detail views showing the relative positions of the fixed and movable pole pieces in two operating stages of the motor;

FIG. 23 shows in perspective magnetic and electric elements of the motor of FIG. 19;

FIG. 24 is an electric circuit diagram of the double pump motor shown in FIGS. 19 to 23.

The figures of the accompanying drawings should be regarded as simplified and partly diagrammatic representations for giving greater clarity to the following explanations; in the known parts of the apparatus (such as the pump members) only the principal parts involved in the improved operation are shown. Some elements, common to the various embodiments have been denoted by the same reference letters and numerals.

Referring to FIG. 1, there will be seen the essential members of a reciprocating motor, improved according to the invention and combined with a gasoline pump of a type currently used in motor-vehicle equipments. This pump comprises a deformable box 1 in the form of bellows which is partly filled and emptied by successively producing the lifting of the suction valve 2, then the delivery of the liquid through the valve 3. The increase in volume of the box 1 is effected very suddenly by putting under voltage a conventional electromagnet provided with a coil $Bm$ having an iron core. This coil exercises a considerable downwardly directed attraction on the iron armature 4. The current in the coil $Bm$ is then interrupted and the armature reascends under the action of a return spring 5. This return movement, effected more or less rapidly according to the fuel requirement, has the effect of delivering the petrol through automatic lifting of the valve 3.

In the usual pumps, the flow of the driving current is controlled directly by an electric switch having a movable contact, this contact functioning like that of trembler bells of the type having an electromagnet provided with a vibrating armature. It is known that contacts of this type do not form very reliable members when they have to interrupt frequently high strength currents in very inductive circuits. Powerful sparks fairly rapidly destroy the parts of the vibrating switch.

According to the invention, a moving contact switch is not used for distributing the working currents I in the coil $Bm$. Inserted in the principal circuit comprising in series the power source G and the driving coil $Bm$, are the electrodes $co$ (collector) and $em$ (emitter) of a power transistor TR, preferably selected from the silicon type having n-p-n junctions. This transistor assumes successively two states: It is a very good conductor for a short period when the armature 4 makes a rapid downward driving stroke; then it blocks the principal circuit as soon as the armature 4 arrives at the bottom of its stroke and ascends more or less slowly under the influence of the return spring 5.

To obtain this result, recourse may be had to various types of "position pick-ups" for ensuring by intermittance, by means of very weak triggering currents and by means of very weakly inductive circuits the passage of relatively strong currents in the junctions of crystals between the collector $co$ and the emitter $em$ of the transistor TR. One of these pick-ups is realised in the diagram of FIG. 1 in the form of an auxiliary triggering circuit connecting the positive terminal of the source G to the base $ba$ of the transistor by means of a very light auxiliary contact K and a non-inductive high resistance R. The contact K is produced between the end of the armature 4 and a flexible blade 6 arranged as shown in FIG. 1. The commencement of the triggering current $i$ occurs only when the armature 4 arrives at the top of its stroke, as seen in FIG. 1. At this instant a positive potential is communicated to the base $ba$ of the transistor and a weak current passes between the collector $co$ and the base $ba$. This current is determined by the resistance R at the minimum value just sufficient to unblock the principal circuit. Consequently, a high-strength current I is rapidly established in the driving or motor electromagnet and the armature 4 is rapidly projected downward, permitting suction of the liquid.

Interruption of the current I at the appropriate time is obtained by the combination of the following means: A little after the commencement of the motor stroke, an insulating stop 7 effects separation of the conducting parts 6 and K, and consequently the triggering current $i$ is interrupted, which involves blocking of the circuit of the coil B$m$; however, the magnetic flux established in the iron core of this coil persists for a certain time because of the well-known phenomenon of self-induction; under these conditions, the attraction of the armature continues over the entire extent of its downward stroke. As soon as the magnetisation of the core of B$m$ becomes weak enough, the armature 4 ascends under the action of the spring 5; the contact 6–K is re-established and the operating cycle just described is automatically repeated.

One of the means of improvement coming within the scope of the invention comprises the addition of a device for prolonging with considerable certainty the motor attraction after the separation of the parts 6 and K. This device comprises, on the one hand, shunting the winding B$m$ by a diode 8, and on the other hand, mounting a conducting ring 9 on the core of the electromagnet. The diode and the ring act as follows: After interruption of the current I by the transistor TR, the magnetic flux in the core of B$m$ begins to decrease but, by reason of the Lenz law, the decrease of this flux is retarded considerably by the induced currents in the shunt 8 and in the ring 9. The armature which has previously acquired considerable kinetic energy, continues its downward course due to the persistent magnetic attraction. It is thus capable of increasing sufficiently the volume of the resilient box 1.

The system just described has the following advantages:

(a) The position pick-up does not deteriorate, because the auxiliary circuit comprising the high resistance R of practically zero self-inductance has an infinitesimal current flowing through it and no spark is produced between the conductors 6 and K;

(b) The means provided for temporarily prolonging the establishment of magnetic flux in the core of B$m$ also permits reduction in the self-inductance overvoltage which would involve the risk of causing deterioration of the crystals of the transistor TR between the electrodes $co$ and $em$;

(c) The transistor TR is not heated, because its internal resistance is very low during the very short times and the power dissipated by Joule effect is small.

FIG. 2 shows the application of the invention to the improvement of the suction and force pump of the movable piston type described in detail in U.S. patent specification No. 2,472,067 issued to J. W. Dickey on June 7, 1949. In this system, a hollow piston forms the iron plunger 10 of an electromagnet B$m$ fed by means of a magnetically controlled switch K. Since the current interrupted is very strong, it is often necessary to add to the pump a cumbersome and expensive anti-interference device. Furthermore, the switch has to be enclosed in a gas-tight enclosure containing a neutral gas. The present invention makes it possible to obviate these disadvantages while radically suppressing the alteration of the switch K; it consists in adopting the assemblage previously described with reference to FIG. 1. The end-of-stroke switch K only establishes a weak signal $i$ which passes across the junction between the base $ba$ and the emitter $em$ of the power transistor TR; this component establishes and interrupts with perfect safety and without spark the high strength driving current I. Further, in the coil B$m$ the passage of the current is prolonged a little by the diode 11 and decreases at a reduced rate. This phenomenon is due to the fact that, during the disappearance of the magnetisation of the soft iron parts, the electromagnetic energy ½ LI², L being self-inductance of the principal circuit, can disappear by passing through the shunt 11. Under these conditions, the self-induction overvoltage is very small and cannot cause deterioration of the transistor TR.

FIGS. 3 to 5 show the application of the invention to a particular form of construction of the gasoline pump shown diagrammatically in FIG. 1. It will be seen that the bellows 1 has been replaced by a flexible diaphragm 12, the central part of which is displaced in the direction $f_1$ by means of the enclosed electromagnet B$m$ provided with a soft iron central plunger 13. After each driving action, corresponding to suction of the liquid arriving by the conduit CA, the centre of the diaphragm is returned upwardly by the return spring 14 acting like the spring 5 of the pump in FIG. 1. The liquid is forced through the conduit CR and the plunger 13, at the ends of its strokes, operates suddenly the switch of an auxiliary triggering circuit performing the functions of a "position pick-up."

The principal elements constituting this pick-up are represented separately in the part (a) of FIG. 4 showing in plan viewed from below, the device for triggering and interrupting suddenly each motor action by means of a power transistor TR connecting according to the circuit of FIG. 5. Modification of the conductivity of TR is obtained by means of two transversely arranged steel blades 15 and 15'. These blades are fixed on a base 16 of moulded insulating material. An opening at the centre of the base permits the free passage of a control sleeve of insulating material 17–17'. This sleeve is carried by an axial rod 18 secured to the plunger 13 of the electromagnet.

The control sleeve is shown separately in perspective in the view (b) of FIG. 4. It will be seen that this part has the form of a dumb-bell, that is to say of two discs 17 and 17' connected by a short rod 19 of small diameter. Between the discs are inserted with fairly substantial clearance the adjacent edges of blades 15 and 15'. Before assembly an initial shape is given to these blades so that in the free state they are inflected downwardly.

The movable ends of 15 and 15' are preferably slit longitudinally and thus form several independent lamallae (for example, four lamellae) provided with small studs of inoxidisable metals which are good conductors. The lamellae are arranged as indicated in the view (a) of the detail diagram of FIG. 4. These lamellae are able to pass suddenly from one to the other of the two following positions:

(a) a position ensuring the sudden opening of the triggering circuit, that is to say, the auxiliary circuit which leads to the base $ba$ of the transistor TR;

(b) a position for which the ends of the blades 15 and 15' bear on the conducting contact pieces K and K' as shown in FIG. 3.

In this latter position, the conducting studs of 15 and 15' are firmly pressed on the contact pieces K and K' by the magnetic attraction exerted by a permanent magnet 20 inserted and stuck in the insulating base 16. This magnet is preferably formed of an insulating ceramic material, for example the material of high coercivity called "Ferroxdure" based on barium oxide; this magnet is shown separately in perspective at the bottom of FIG. 4, view (b).

The electrical and electronic components of the motor considered are connected together as shown in the diagram of FIG. 5 (which diagram is similar to that of FIG. 1 described previously). The principal circuit terminating at the + and − terminals of the source comprises the motor coil B$m$ and the electrodes $co$ (collector) and $em$ (emitter) of the transistor TR which distributes the pulses of the motor current. The circuit triggering the motor actions terminates, on the one hand, at the + terminal of the source, and on the other hand, at the base $ba$ of the transistor; it comprises a noninductive high resistance R and the intermittent electrical contacts operated by one of the blades 15 or 15'. There may also be added a two-way switch operable from the exterior of the pump for putting into operation optionally either the blade 15 or the blade 15', the latter serving as reserve pick-up in the event of accidental deterioration of the contacts between 15 and K.

The pump unit constructed according to FIGS. 3 to 5 operates in the following manner;

During the commencement of each stroke ensuring the delivery of the liquid under the return action of the spring 14, the movable contacts are spaced away from the contact pieces K and K', this result being due to the preliminary downward curvature of the blades 15 and 15'. Only at the end of the upward stroke of the plunger 13 does the disc 17' of the control sleeve gradually raise the blades 15 and 15'. Due to the fact that the magnetic forces of attraction exerted by the magnet 20 increase considerably when the air-gaps decrease, the blades 15 and 15', which are approaching 20, are very suddenly inflected upwardly and consequently electrical contact is definitely established on the conducting contact pieces K and K'. These contacts are strongly pressed together and thus ensure under perfect conditions the passage of the weak triggering current $i$ through the electrodes $ba$ and $em$ of the transistor TR. Consequently, the transistor TR passes to the state of the perfect conductivity and the coil B$m$ receives a current I of considerable strength. This coil attracts the plunger 13, connected to the diaphragm 12, downward. The stroke in the direction $f_1$ is effected very rapidly, producing the suction of the liquid. It will be noted that the passage of the motor current persists during a considerable part of the plunger stroke. This is due to the clearance existing between the blades 15, 15' and the discs 17, 17' of the control sleeve secured to the plunger 13.

As soon as the large diameter top part 17 of the control sleeve reaches the blades 15–15', the latter are urged downward and subsequently they are suddenly released by the magnet 20. The trigger circuit is thus opened, such that the working current I is also interrupted, permitting the plunger 13 to re-ascend under the action of spring 14.

It should be noted that during the interruption of the motor current I, lifting of the diaphragm 12 may be effected more or less slowly in proportion to the fuel demand. The previously described working cycle is repeated automatically as soon as the lower part 17' of the control sleeve (connected to the piston 13) has inflected upwardly sufficiently the switch blades 15 and 15' for ensuring sudden establishment of the electrical contact on the contact pieces K and K'.

FIG. 6 represents a constructional modification of the diaphragm pump previously described with reference to FIGS. 3 to 5. The motor members for lifting the diaphragm 12 are of the electrodynamic type and comprise substantially a permanent magnet inductor 21 reciprocating in the vertical direction $yy'$ relative to a fixed winding B$m$. The magnet 21 is formed by a toroid ring of axis $yy'$, to which has been given a powerful axial magnetisation. This magnet is formed of a material of high coercivity, such as the material called "Ferroxdure," produced by compression of powders based on barium ferrite. The annular faces of the magnet 21 are stuck respectively to two soft iron pieces 22 and 23 in the form of co-axial cups of unequal heights and diameters as shown by the section of FIG. 6.

Between the concentric parts connected respectively to the annular pole faces (north and south) of the magnet 21, there is formed an annular air-gap of low reluctance having a very strong radial magnetic field. Accommodated in this air-gap with a certain clearance is the hollow coil B$m$ held stationary by a support 24 of moulded insulating material, connected to the frame of the pump, as indicated in FIG. 6.

The magnet 21 secured to the pole pieces 22 and 23, is provided with a non-magnetic central sleeve 25 adapted to slide very freely on an axial rod 26 of non-magnetic metal, the upper end of which is fixed to the centre of the diaphragm 12, while the lower part is guided by a bearing of self-lubricating material. This guide piece 27 is at the bottom of the housing 28 of the pump. Bearing bushings 25' 25" are interposed between sleeve 25 and rod 26.

Placed between the diaphragm and the motor equipment or motor unit 21, 22, 23 is a first compression spring 29, and below the equipment is arranged another compression spring 30 supported on a collar 31 fixed on the rod 26, above the guide 27 as shown in the figure. It will be seen that the magnetised mass may make an oscillatory movement of translation of fairly large amplitude between the springs 29 and 30.

As in the pump of FIG. 3, the active movements of the diaphragm centre are produced by supplying to the coil B$m$ unidirectional current pulses distributed by means of a power transistor, the passages of the motor current occurring only during the short periods of suction of the liquid. The electomagnetic forces directed along $yy'$ result from the action of the current on the radial magnetic field established in the annular air-gap and it is possible to select the direction of the current for suitably directing the motor actions. It will be noted that the phenomenon employed is that utilised in electrodynamic loudspeakers, while obviating the use of a moving coil which would necessitate flexible connections too delicate for a robust and inexpensive industrial apparatus.

The pump thus provided could be completed by a "position pick-up" of the previously described type. The invention also provides another means for permitting the complete elimination of moving switches. This means consists in arranging against the coil B$m$ a pick-up winding B$c$ arranged, as shown in FIG. 6, in the annular air-gap between the pole pieces 22 and 23. In principle, triggering of the motor actions is operated as follows: When the inductor unit 21, 22, 23 assumes an oscillatory movement relative to the windings in the air-gap, the coil B$c$ will have an alternating voltage induced therein (Faraday phenomenon), and one of the alternations of this voltage may generate a trigger current $i$ capable of ensuring temporary conductivity of a transistor TR in a circuit similar to that shown in FIG. 5. However, for the device under consideration to operate correctly, it is necessary to eliminate the continual reaction coupling resulting from the proximity of the coils B$c$ and B$m$. Although effective means are known for preventing the initiation of continual electrical oscillations (for example the addition of a capacitor called "decoupling" capacitor between the electrodes $co$ and $ba$ of the transistor TR), experience has shown it to be advantageous to place the pick-up coil in a separate magnetic field fairly remote from the field acting on the motor coil B$m$. An embodiment modification having this feature is shown in FIGS. 7 to 10.

The section in FIG. 7 shows the changes made in the motor unit previously described with reference to FIG. 6. The parts retained without change are denoted by the same reference letters and numerals. The modification concerns mainly the oscillating mass comprising two coaxial magnets 32 and 33, the internal lines of force of which are parallel to the pump axis but are directed in opposite directions as shown by the arrows in the drawing.

The magnets 32 and 33 are stuck on either side of the base of a cup-shaped pole piece 34. The external faces of the magnets are stuck to two other cups 35 and 36 forming with the middle cup 34 two annular air-gaps, across which extend radial lines of forces of opposite directions. The motor unit thus constructed is shown separately in plan, seen from below in FIG. 8, and in axial section in FIG. 9.

The relatively bulky motor coil B$m$ is arranged in the air-gap between the tubular parts of the cup pieces 34 and 33, while the pick-up coil B$c$ is placed between the cups 34 and 36.

The components of the electric circuits and the connections are shown in the diagram of FIG. 10. It will be seen that the motor coil B$m$ is connected between the positive and negative terminals of the power source in a principal circuit also comprising the electrodes co (collector) and em (emitter) of the transistor TR. The pick-up winding Bc is connected to the positive terminal and the base ba of the transistor. It is possible to connect between the positive terminal and the coil Bc a decoupling capacitor $C_1$ and, between the base ba and the collector co, a decoupling capacitor $C_2$ and a high resistance R ensuring certain positive bias of the transistor base. Experience shows that the components $C_1$ and R facilitate automatic starting of the pump of FIG. 7. The operation of this pump is ensured as follows:

As soon as the power source is put into service, the motor mass comprising the magnets 32 and 33 begins to oscillate with increasing amplitude, the springs 29 and 30 being successively compressed and expanded. The centre of the diaphragm 12 is consequently subjected to a reciprocating force, resulting in movements along yy' producing suction and delivery of liquid. When the flow of liquid is reduced, the diaphragm 12 cannot move freely upward, but the oscillatory movement of the inductor unit nevertheless continues at a frequency depending on the elasticity of the springs 29 and 30. In the case where the diaphragm 12 and rod 26 are stationary, damping of the oscillating mass becomes very weak because the unit slides on the rod 26 with slight friction. Under these conditions, the amplitude of the reciprocatory movement assumes a relatively high value and the motor current I is greatly reduced by the back electromotive force induced in the coil Bm owing to the speed of the magnet 32. It will be noted that for this reason, the demand for current is regulated automatically to a minimum value. The electric power supplied by the power source adapts itself spontaneously to the mechanical power required by the more or less considerable delivery of the pump. The power efficiency is therefore satisfactory.

FIG. 11 represents another example of the application of the invention to a fluid pump of the kind previously described with reference to FIGS. 3 to 5. The diaphragm 12 producing suction and delivery of the fluid is not shown; it is actuated by the plunger 13 of an electromagnet Bm fed at the desired time by a transistor TR. The modification made in the previously examined construction concerns solely the "position pick-up" which is made in the form of a small magneto-electric generator for translating the speed of the plunger 13 into a proportional weak current i, this current forming the input signal for acting on the base of the transistor and thus triggering the motor pulses I.

The new translator pick-up comprises a small permanent magnet 37 having vertical lines of force, provided with flat pole pieces 38 (north) and 39 (south). This magnet is secured to the plunger 13 by an axial rod 40. Fixed in front of the magnet, as shown in FIG. 11, is an E-shaped laminated magnetic circuit, the three transverse arms of which are horizontal. The middle arm is surrounded by the generator coil Bc. The fixed and movable pole pieces are very close to each other and occupy the relative positions of FIG. 11 when the plunger 13 is in the middle of its vertical strokes. It will be seen that, for this particular position, the magnetic flux in the coil Bc is zero, but an inductor flux appears after any movement of the magnet, as indicated by the views a and b of FIG. 12. These views show respectively the relative positions of the magnet 37 and pick-up coil when the plunger 13 arrives at the top and then at the bottom of its stroke. For the position a, the magnetic flux in the core of Bc is directed from right to left, while for position b, the direction of the flux is reversed. Under these conditions, when the plunger oscillates vertically, the flux reversals induce in the coil Bc an alternating electromotive force capable of generating a triggering signal i. This signal may be used in a circuit similar to that described with reference to FIG. 10. By a suitable choice of connections, the alternations of the current i produced by the abrupt downward movement of 37 will produce conductivity of the transistor TR, and consequently the flow of motor current I.

It will be noted that the arrangement of the motor coil Bm and pick-up coil Bc shown in FIG. 11 (which coils have their axes perpendicular) is such as to prevent continuous electromagnetic coupling between the input and output of the transistor. When these coils are connected to the power source and to the transistor TR in accordance with the circuit diagram of FIG. 10, there is no need to have recourse to a decoupling capacitor $C_2$ to avoid the persistance of a high-frequency electrical oscillation which would interfere with the desired functioning.

When the plunger 13 is stationary at the top of its stroke, starting of the motor shown in FIG. 11 necessitates a device capable of producing a weak current i in the trigger circuit comprising the base ba and emitter em of the transistor TR for unblocking the principal circuit feeding the motor electromagnet Bm. This result is obtained by providing the plunger 13 with a brief contact 6–K constructed like that previously described in connection with the pump of FIG. 1. Under these conditions, prefectly reliable functioning of the motor is ensured by two pick-up devices having complementary qualities. In the case of a gaseous fluid pump provided with a plunger 13, to which an oscillatory movement is constantly imparted, the contact pick-up is only necessary for starting the reciprocatory movement; the switch 6–K may then be put out of circuit, normal operation being ensured solely by the induction pick-up coil Bc.

The magneto-electric device shown in FIG. 12 is reversible; instead of using it for generating a signal it may be used for developing vertical mechanical forces by means of currents fed to the fixed coil. This property is utilised in the pump having two conjugate diaphragms 41 and 42 shown in FIGS. 13 and 14. In this embodiment, the diaphragms are deformed simultaneously by means of a motor, the movable element of which is formed by a permanent magnet 43 provided with pole pieces 44 and 45. This magnet has the form of a ring through which pass lines of force parallel to its axis; it is adapted to slide with low friction on an axial rod 46 connecting together the centres of the diaphragms 41 and 42.

The motor of the double pump shown in FIGS. 13 and 14 is based on the general principle already explained in connection with the devices of FIGS. 7 and 11; it has merely the following constructional features: The motor forces exerted downwardly on the rod 46 are produced by means of a number of coils Bm, connected in series, for energising magnetic circuits 47, 48 and 49. The electromagnetic actions are transmitted to the diaphragms 41 and 42 by two compression springs arranged above and below the motor magnet. The oscillations of this magnet are maintained by current pulses I opportunely distributed in the motor coils during the downward movements of the unit 43, 44, 45. Unblocking of the feed circuits of the coils Bm is obtained, as in the previously described systems, by means of a transistor and a small pick-up Bc. This latter element may be constructed as shown in FIG. 12.

The motor members embodied in FIGS. 11 to 14 may be constructed in different ways without departing from the scope of the invention. The rectilinear movement of translation of the plunger 12 or of the magnet 43 may obviously be replaced by a circular reciprocatory movement. By way of example, FIG. 15 shows a double pump comprising two bipolar motor magnets 50 and 51 mounted on parallel shafts 52 and 53. As shown in the figure, partly diagrammatically, these magnets have cylindrical pole faces arranged between two E-shaped magnetic circuits, the middle arms of which are placed in juxtaposition and surrounded by the coils (pick-up) and Bm (motor). The electrical circuits to be provided are similar to those in FIG. 10. By means of appropriate transmission members, such as the arms 56 and 57, two pump pistons 58 and 59 are caused to oscillate in opposite directions along the horizontal line xx'.

The improved motors just described are applied to various types of utilisation apparatus necessitating the maintenance, with forces of considerable intensity, of the reciprocation of working members at various rates. Two typical applications only, coming within the scope of the invention, will be briefly described: Hammer or vibrating diaphragm type acoustic warning devices and "blinker" apparatus for periodically interrupting signalling circuits. These two systems are embodied in FIGS. 16 and 17.

In the acoustic warning device of FIG. 16, the centre of the diaphragm 60 is connected by a rod 61 to the armature 62 of an electromagnet Bm. At the end of the motor strokes, which take place from left to right, the rod 61 causes separation of the conductors of a lightweight electric switch K, closing and opening indirectly the circuit of the bobbin Bm by means of a power transistor. This element acts like the transistor TR shown in FIGS. 1 and 3 to 5. At the end of each return stroke of the rod 61 (stroke from right to left), the contact K establishes a weak current $i$ ensuring unblocking of the circuit of the motor electromagnet. The vibrations of the diaphragm 60 are thus maintained by bringing into play powerful pulses I, and deterioration of the auxiliary contact K is avoided.

The improved motor of FIG. 17 works like that of FIG. 1, but a special device permits the motor strokes to be suitably spaced. The apparatus considered comprises substantially an ordinary electromagnet Bm, the armature of which, when it is at rest, establishes a light contact K with the lever 63. This lever, pivoted at 0, is returned by a spring 64 to the position shown in the figure. This lever is fast with a flywheel 65. The contact K and the coil Bm are connected in circuits similar to those of the pump of FIG. 1. It will be seen that the weak current $i$, established by the contact K, triggers the flow of a current of high strength I between the electrodes co and em of the transistor TR. Consequently, the armature of the electromagnet is suddenly attracted and rotates the lever 63 and the flywheel 65. At the end of the small motor stroke of the armature, the flywheel 65 continues its rotary movement due to the kinetic energy stored in the mass in movement. The parts of the contact K are separated and the transistor TR, having become insulating, also interrupts the supply to Bm. At the end of a certain time, which depends on the moment of inertia of the flywheel 65, the lever 63 is returned by the spring 64 to the initial position shown in FIG. 17. The triggering current is again established and the working cycle just described is repeated indefinitely, whereby the principal current in Bm is interrupted periodically at a moderate rate. In the same way, supply to all the other appliances connected in parallel with Bm is interrupted. Thus, it is possible to cause signal lamps, such as 66, to "blink."

To obviate any risk of deterioration of the transistor TR by the self-induction overvoltage resulting from the suden variations of the current I, it is advantageous to connect to the terminals of the coil Bm a non-linear resistance (VDR), the value of which decreases with increase in the voltage.

The "position pick-ups" of the movable contact type K may be replaced by other devices adapted to modify the resistance shown at R in the diagrams of FIGS. 1, 5 and 17. In particular, it is possible to employ the variations in resistance of the contacts between several discs of carbon stacked one upon the other and compressed more or less by a control piece. It is known, in fact, that the total conductivity of a set of small superimposed carbon discs, as indicated by the view in perspective on the right of FIG. 18, is substantially proportional to the square root of the pressure. The connections of the resistance R' thus formed may be provided on the outer faces of the discs 67 and 68 which are electroplated with copper.

The part sectional view of FIG. 18 shows the adaptation of a variable resistance R', of the carbon disc contact type, to the pump motor described above with reference to FIGS. 3 to 5. The carbon discs are placed without clamping in a socket of the insulating base 16, as shown in the figure, and in the absence of pressure these discs have a very high electrical resistance; this resistance, however, decreases considerably when a steel blade 69 bears strongly on the stack of carbon discs. This pressure appears when the plunger 13 occupies its starting position, because the blade 69 is strongly attracted upward by a small magnet fitted in the base 16. As soon as connection is made to the power source, the motor assumes a reciprocatory movement like the device of FIG. 3.

The motors previously described comprise only one transistor TR and necessitate input via the base $ba$ of a current $i$ capable of ensuring maximum conductivity of the junctions between the electrodes co and em. Experience shows that when a transistor of high power is used in the circuits of the kind of FIG. 10, a fairly large and bulky inductive pick-up has to be used. With a view to the construction of very compact improved motors affording high specific powers, reduction in the volume and the electrical consumption of the pick-up device for unblocking the feed circuit of the motor winding Bm may be considered. This result is easily obtained by effecting preamplification of the weak current $i$ supplied by the pick-up Bc. For this purpose, preamplification may be effected by a second transistor. As example of the application this combination of two transistors, FIGS. 19 to 24 represent a motor of high effective power and high efficiency, the motor winding of which comprises two coils $Bm_1$ and $Bm_2$ fed simultaneously by means of two associated transistors TR and TR', permitting the place occupied by the pick-up coil BC to be reduced.

The compact motor under consideration is combined with the mechanical members of the pump having two conjugate resilient diaphragms (41 and 42) previously described with reference to FIG. 13. Corresponding parts of the two embodiments are denoted by the reference letters and numerals previously employed.

To reinforce the propulsive actions and to utilise better the restricted space between the diaphragms connected together by the axial rod 46, the motor mass is formed by the superposition of four annular permanent magnets $A_1$, $A_2$, $A_3$ and $A_4$ of a material characterised by low bulk weight and by an extremely high coercive field like the ceramic substance on a basis of barium ferrite known commercially as "Ferroxdure II," "Caslox," "Spinalor," "Indox." One of these magnets ($A_2$) is shown separately in perspective in the detail FIG. 23; the internal lines of force are short and directed parallel to the axis yy'.

The magnets are stuck on five circular iron plates arranged perpendicularly to the axis yy'. The peripheries of these plates are reinforced as indicated in the figure and thus form pole pieces strongly magnetised with the polarities N (north) and S (south). The lines of force in the interior of the superimposed magnets are directed in opposite directions as indicated by the arrows in the drawing. Externally of the pole pieces of the magnets, the lines of forces spread out, forming very strong radial magnetic fields.

The middle plate 70, situated between the magnets $A_2$ and $A_3$, forms a thin partition of N (north) polarity, provided with a central sleeve 80 surrounding the axial rod 46. In the sectional view of FIG. 19, it will be seen that the part 70 and its sleeve 80 are provided with an axial pole 81 of larger diameter than that of the rod; the sleeve is provided with guide bearings 82, 82' of self-lubricating material, adapted to slide on the rod 46 with very low friction and without risk of seizing. Springs 71 and 72 are interposed between the diaphragm 41 and 42 of the pump and the middle partition 70. The rod 46, and sleeve 80, which thus surround the springs, are formed of non-magnetic materials.

The set of four magnets, connected together by their pole pieces from a motor mass or movable unit, which is adapted to make an oscillatory movement of translation under the influence of a series of electromagnetic pulses directed vertically in the direction corresponding to the movement.

Around the oscillating mass, concentrically to $yy'$, are placed soft iron pole pieces 73, 74, 75 and 76 fast with the pump housing 77. These pole pieces are extended to the exterior by fixed partitions 83, 83', 83'', 83''', connected to soft iron tubular yokes 84, 84' surrounding the two motor coils $Bm_1$ and $Bm_2$, as well as the central pick-up coil $Bc$. This latter coil is very flat, while the other windings are of greater volume and are formed of insulated wire of relatively large diameter. The coil $Bc$ is accommodated between two soft iron partitions 78 and 79. The inner edges of these partitions are enlarged as indicated in the detail views of FIGS. 20 and 21.

The clearances (or radial air-gaps) between the motor mass and the ferromagnetic circuits surrounding it are fairly considerable and any risk of friction is thereby avoided. Furthermore, the profiles of the fixed and movable pole pieces are so determined that the reluctances of the magnetic circuits energised by the central magnets undergo only slight variations when the motor mass moves along $yy'$. Under these conditions, the axial forces of magnetic attraction always remain small compared with the return forces exerted by the springs 71 and 72. In the absence of current in the windings, the unit assumes the middle position of rest shown in FIG. 19. It will be seen that for this position, the pole piece 70 is opposite the pick-up coil $Bc$; the pole piece S, situated between the magnets $A_1$ and $A_2$, is opposite the annular air-gap of the magnetic circuit surrounding the motor coil $Bm_1$, while the pole piece S', situated between the magnets $A_3$ and $A_4$, faces the air-gap of the magnetic circuit of $Bm_2$.

When the motor unit is at the top of its stroke, the pick-up coil $Bc$ is opposite the magnet $A_3$ and encircles a considerable magnetic flux $+\phi$, as shown in the part view of FIG. 20. Then, when the unit passes through the middle position of FIG. 19, this magnetic flux is suppressed. The flux embraced by $Bc$ reverses and becomes $-\phi$ when the magnet $A_2$ is opposite $Bc$, as shown in FIG. 21 corresponding to the bottom position of the unit.

The magnetic fluxes encircled by the motor coils $Bm_1$ and $Bm_2$ is also reversed when the motor unit performs a stroke from its top position to its bottom position. The part view of FIG. 22 shows, for example the directions of the lines of force when the magnet A, at the bottom of its stroke, is opposite the circular air-gap of the magnetic circuit surrounding $Bm_2$.

The electrical and electronic components of the motor of FIG. 19 are shown in the diagram of FIG. 24, in which TR' denotes an auxiliary transistor of low power for amplifying a first time the current induced in the pick-up coil $Bc$ according to Faraday's law. This coil $Bc$ is connected to the positive terminal of the power source and to the base $b'$ of the transistor TR'. The current $i$ from the collector $c'$ of TR' feeds the base $ba$ of the power transistor TR which supplies intermittently a high strength current I to the series rotor coils $Bm_1$ and $Bm_2$. A resistance $Rp$ partly biases the transistor TR' and causes a weak initial current to flow in the motor coils $Bm_1$ and $Bm_2$ as soon as the power source is put into service.

Preferably, a decoupling capacitor $C_d$ is connected between the electrodes $b'$ and $c'$ of TR', and the motor winding is shunted by a diode 8 or by a non-linear resistance VDR for reducing transient self-induction overvoltages resulting from the sudden rupture of the motor circuit.

The connections should be made so that starting of the motor occurs spontaneously under the following conditions:

The weak initial current flowing in $Bm_1$–$Bm_2$, as soon as the motor is under voltage, produces a slight upward movement of the motor unit. Consequently, an electromotive force is induced in the pick-up coil $Bc$ and the resulting current adds its effect to the initial bias voltage of the base $b'$ of TR'. The electromotive force acting on the unit is amplified as soon as this unit stops at the top of its stroke due to the opposing action of the return spring 71. Under these conditions, the unit returns downwardly and then induces in the pick-up coil an electromotive force in the opposite direction to the preceding electromotive force. This reversal of the electrical induction voltage opposes the flow of intial bias current and the two transistors block the circuits. The action of the return springs 71 and 72 is then exerted freely for returning the movable unit towards its middle position, and then to the bottom position under the effect of the acquired speed. The lower spring 72 repropels the unit upwardly, and in the course of this new ascent, the current induced in $Bc$ assumes a greater strength than before; this current produces the flow of an increased motor current in the windings $Bm_1$–$Bm_2$ and the upward stroke of the unit is amplified. The operation just described is repeated.

It is then clear how self-starting of the motor is produced and how the amplitude of the oscillatory movement may be imparted to the diaphragms 41 and 42 of the pump. It should be noted, however, that the extent of the reciprocating strokes is limited by the passive mechanical forces as well as by an increasing back electromotive force, proportional to the rate of variation of the magnetic fluxes encircled by the motor windings $Bm_1$ and $Bm_2$. Experience shows that it is easily possible to choose the characteristics of these windings for stabilizing the self-maintenance conditions of the unit under conditions such that mechanical end-of-stroke shocks are obviated or very much attenuated.

In the mode of operation just described, only one alternation of the alternating electromotive force induced in the pick-up coil $Bc$ is used for releasing the motor pulses of a single direction. Without departing from the scope of the invention, it would be possible to add another switching device similar to that of FIG. 24 for supplying propulsive pulses to the motor windings during the downward strokes of the unit. The latter would thus be actuated on the forward and return stroke which would permit doubling of the effective work performed during a complete stroke. This result could be obtained without considerable complication by replacing the circuit of FIG. 24 by a "push-pull" switching device operating as follows: An alternation of voltage induced in the pick-up coil $Bc$ would trigger the propulsive actions exerted upwardly by the coil $Bm_1$: the next alternation would trigger forces exerted downwardly by the suitably connected coil $Bm_2$. It is obvious that advantage could be taken of the alternating signal current delivered by the pick-up $Bc$ for reversing the direction of the motor current in the working windings $Bm_1$ and $Bm_2$ connected in series.

The motors described in the foregoing may be fed either by electrochemical power sources (batteries of cells or accumulators) or by alternating electromotive force sources, half-wave or full-wave rectifiers being interposed.

As follows from what has already been said, the invention is by no means limited to those of its modes of application or to those of the embodiments of its various parts which have been more particularly explained; on the contrary, it covers any modifications. In particular, the improved type of motor according to the invention is applicable to gas aspinators or compressors of the bellows or moving piston type; it is also suitable for apparatus

We claim:

1. A reciprocating electric motor and pump combination comprising a common housing (28);
at least one flexible diaphragm (12) arranged across said housing and dividing said housing into two compartments, one compartment containing the motor and the other being provided with a suction opening (CA) and with a discharge opening (CR) for the liquid to be pumped;
a central rod of non-magnetic material (26) slidably arranged in said housing along the axis thereof, said diaphragm being centrally connected to an end of the central slidable rod;
a fixed motor winding (Bm) arranged inside said housing coaxially with said rod;
at least one ring-shaped permanent magnet (21) coaxially arranged on said rod to freely slide thereon within said winding, said permanent magnet being made of a material of high coercitivity and being magnetized in axial direction;
means for feeding unidirectional current pulses to said winding, whereby the movable permanent magnet is displaced in one direction along said rod, said means comprising a source of unidirectional potential, transistor means connected between said source and said winding, triggering means (Bc) cooperating with said magnet and connected to the control electrode of the transistor and arranged to cause said transistor to become conductive when said trigger means is in one end position of said movable magnet;
and a coupling spring (29) located between one end face of the magnet (21) and said diaphragm (12).

2. The combination according to claim 1 including abutment means (31) arranged coaxially to the central rod (26) near one end of the housing;
and return spring means arranged between said abutment (31) and the other end face of said ring-shaped permanent magnet (21).

3. The combination according to claim 1, wherein the ring-shaped permanent magnet is provided with a central sleeve (25) of non-magnetic material having bearings (25', 25") whereby it is freely guided in axial movement along the central rod (26).

4. The combination according to claim 1, wherein said motor winding (Bm) is an annular coil;
annular cup-shaped pole pieces of magnetic material (22, 23) having cylindrical sidewalls are coaxially secured to opposite front faces of the ring-shaped permanent magnet (21), the cylindrical sidewalls of said cup-shaped pole pieces defining an annular gap;
an annular bracket member (24) of insulating material secured to the housing and extending into said gap and carrying said annular motor winding (Bm);
said triggering means comprising an annular pick-up coil (Bc) arranged in alignment with the driving coil to cooperate with said magnet at one end of the stroke thereof and connected to trigger the transistor means.

5. The combination according to claim 1, wherein said ring-shaped magnet (FIG. 7: 32) is provided with two cup-shaped pole pieces (34, 35) of magnetic material having different diameters and concentrially secured to both end faces of said magnet, respectively, to define an annular gap;
an annular bracket secured to the housing and carrying said fixed annular motor winding (Bm) extending into said annular gap;
a second annular magnet (33) having a smaller diameter than said ring-shaped magnet (32) and secured by one of its end faces to one face of said ring-shaped magnet;
an inside pole piece (36) of magnetic material secured to the second end face of said second magnet (32) and defining with the second pole piece (34) of the ring-shaped magnet (32) a second annular gap;
a second annular bracket concentric to said first and secured to the housing;
and a pick-up coil (Bc) carried by said second bracket and forming said triggering means extending in said second annular gap and cooperating with said second magnet at one end of the stroke of the movable magnet, the direction of axial magnetization of said magnet being opposed to the direction of magnetization of said first magnet.

6. The combination according to claim 1 (FIG. 13), wherein said cylindrical housing is formed of a central sleeve and two cap-shaped members covering the ends of said sleeve, respectively, and each provided with a suction opening and with a discharge opening;
two circular flexible diagrams arranged across the ends of the cylindrical housing and having their edges clamped between the circular edges of the ends of the housing and the edge of the corresponding cap member, the ends of the central rod being arranged to freely slide along the axis of the housing and being secured to the central parts of both diaphragms, respectively;
and two helical springs (29a, 29b) arranged around said rod (46) between each diaphragm (41, 42) and the corresponding end face of the permanent magnet (43) respectively.

7. The combination according to claim 1 (FIGS. 13, 14) comprising a plurality of magnetic yokes (47) arranged inside the housing and having each three cores arranged one above the other in a radial plane with respect to the housing, the central core of each of said yokes, except one, carrying said motor winding (Bm);
said triggering means including a pick-up coil;
the central core of the remaining one of said yokes carrying said pick-up coil (c) triggering the transistor;
said central yokes being located in a transverse plane corresponding to the plane of symmetry of the movable magnet (43) in the position of rest thereof;
and disc-shaped pole pieces (44, 45) of magnetic material arranged on both front faces of said movable magnet.

8. The combination according to claim 1, wherein said ring-shaped permanent magnet is formed of four stacked permanent annular magnets ($A_1$, $A_2$, $A_3$, $A_4$) made of a material comprising barium ferrite, said magnets being magnetized with an axial magnetization alternately in opposite direction;
annular discs (70) of magnetic material are located between the stacked magnets and on the end faces of the extreme magnets, said discs having reinforced circular edges forming pole pieces;
said pick-up means including an annular pick-up coil (Bc) arranged concentrically to the movable magnet system in the transverse plane of symmetry of the housing;
said motor winding including two annular driving coils ($Bm_1$, $Bm_2$) arranged in said housing at either side of said pick-up coil and channel-shaped annular members (73, 74, 75, 76) of magnetic material opening inwardly and surrounding said coils;
a sleeve (80, 82, 82') slidable on the central rod (46), said sleeve being secured to the central magnetic disc located between the second and third magnet;
a pair of diaphragms (41, 42) one each located at opposite ends of said motor;
and a pair of springs (71, 72), one each coupling the movable magnet system with respective diaphragms and, respectively, cooperating with the opposed faces of said central disc.

References Cited

UNITED STATES PATENTS

| | | | |
|---|---|---|---|
| 2,469,137 | 5/1949 | Strong. | |
| 2,898,860 | 8/1959 | Grober | 103—53 |
| 3,103,603 | 9/1963 | Reutter | 310—30 |
| 2,935,629 | 5/1960 | Chausson | 310—27 |
| 1,047,625 | 12/1912 | French | 310—35 XR |
| 3,293,516 | 12/1966 | Maier et al. | 318—128 |
| 3,058,649 | 10/1963 | Plegat | 230—55 |
| 2,003,647 | 6/1935 | Dillstrom | 103—53 XR |
| 3,306,217 | 2/1967 | Hirano | 310—18 XR |
| 2,986,683 | 5/1961 | Lovet et al. | 318—132 |
| 1,528,627 | 3/1925 | Peters | 338—47 XR |
| 2,686,280 | 8/1954 | Strong et al. | 310—18 XR |
| 2,988,264 | 6/1961 | Reutter | 310—18 XR |
| 3,381,616 | 5/1968 | Wertheimer et al. | 103—53 |
| 3,230,889 | 1/1966 | Brewer | 310—18 |

FOREIGN PATENTS

| | | |
|---|---|---|
| 1,388,616 | 5/1966 | France. |
| 1,003,334 | 2/1957 | Germany. |
| 843,698 | 7/1939 | France. |

U.S. Cl. X.R.

103—53; 230—55; 310—18, 31; 318—132, 134

MILTON O. HIRSHFIELD, Primary Examiner

B. A. REYNOLDS, Assistant Examiner